United States Patent
Hayakawa

(10) Patent No.: US 9,555,799 B2
(45) Date of Patent: Jan. 31, 2017

(54) CONTROL DEVICE FOR HYBRID VEHICLE, HYBRID VEHICLE PROVIDED WITH SAME, AND CONTROL METHOD FOR HYBRID VEHICLE

(71) Applicant: Yuki Hayakawa, Okazaki (JP)

(72) Inventor: Yuki Hayakawa, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 105 days.

(21) Appl. No.: 14/434,447

(22) PCT Filed: Dec. 19, 2013

(86) PCT No.: PCT/IB2013/003047
§ 371 (c)(1),
(2) Date: Apr. 9, 2015

(87) PCT Pub. No.: WO2014/111749
PCT Pub. Date: Jul. 24, 2014

(65) Prior Publication Data
US 2015/0258986 A1   Sep. 17, 2015

(30) Foreign Application Priority Data
Jan. 16, 2013  (JP) .................... 2013-005285

(51) Int. Cl.
*B60L 9/00*        (2006.01)
*G05D 1/00*       (2006.01)
(Continued)

(52) U.S. Cl.
CPC .............. *B60W 20/50* (2013.01); *B60W 10/06* (2013.01); *B60W 10/08* (2013.01); *B60W 10/26* (2013.01);
(Continued)

(58) Field of Classification Search
CPC .............. B60W 2050/0295; B60W 2510/244; B60W 2710/0644
See application file for complete search history.

(56) References Cited

U.S. PATENT DOCUMENTS

2008/0093851 A1    4/2008   Maeda et al.

FOREIGN PATENT DOCUMENTS

JP    2001-263096    9/2001
JP    2003-328804    11/2003
(Continued)

*Primary Examiner* — Bhavesh V Amin
(74) *Attorney, Agent, or Firm* — Finnegan, Henderson, Farabow, Garrett & Dunner, LLP

(57) ABSTRACT

In a control device for a hybrid vehicle, the charge/discharge setting unit sets a charge/discharge demand for an electricity storage device during a limp home mode, and the operation control unit controls an engine and a motor generator such that the electricity storage device receives/outputs a power in accordance with the charge/discharge demand set by the charge/discharge setting unit. In the case where a charge/discharge amount X input/output to/from the electricity storage device when the engine is operated to generate a required driving force is smaller than a charge/discharge amount Y based on the charged state of the electricity storage device, the charge/discharge setting unit sets, as the charge/discharge demand, the smaller one of the charge/discharge amount Y and a charge/discharge amount Z based on the upper-limit rotation speed of the engine set in accordance with a torque transmitted by a drive shaft.

9 Claims, 7 Drawing Sheets

(51) Int. Cl.

| | | |
|---|---|---|
| *G06F 17/00* | (2006.01) | |
| *B60W 20/00* | (2016.01) | |
| *B60W 10/06* | (2006.01) | |
| *B60W 10/08* | (2006.01) | |
| *B60W 10/26* | (2006.01) | |
| *B60K 6/445* | (2007.10) | |
| *B60W 50/029* | (2012.01) | |

(52) U.S. Cl.
 CPC ....... *B60K 6/445* (2013.01); *B60W 2050/0295* (2013.01); *B60W 2510/244* (2013.01); *B60W 2710/0644* (2013.01); *B60W 2710/248* (2013.01); *Y02T 10/6239* (2013.01); *Y02T 10/6286* (2013.01)

(56) References Cited

FOREIGN PATENT DOCUMENTS

| JP | 2008-109740 | 5/2008 |
|---|---|---|
| JP | 2013-237349 | 11/2013 |

WHEN CHARGE/DISCHARGE AMOUNT X > 0 IS SATISFIED

WHEN CHARGE/DISCHARGE AMOUNT X < 0 IS SATISFIED

CONTROL DEVICE FOR HYBRID VEHICLE, HYBRID VEHICLE PROVIDED WITH SAME, AND CONTROL METHOD FOR HYBRID VEHICLE

CROSS-REFERENCE TO RELATED APPLICATIONS

This application is a national phase application of International Application No. PCT/IB2013/003047, filed Dec. 19, 2013, and claims the priority of Japanese Application No. 2013-005285, filed Jan. 16, 2013, the content of both of which is incorporated herein by reference.

BACKGROUND OF THE INVENTION

1. Field of the Invention

This invention relates to a control device for a hybrid vehicle, the hybrid vehicle provided with the same, and a control method for the hybrid vehicle, and particularly to a control device for a hybrid vehicle including an internal combustion engine and a drive motor, the hybrid vehicle provided with the same, and a control method for the hybrid vehicle.

2. Description of Related Art

Japanese Patent Application Publication No. 2003-328804 (JP 2003-328804 A) discloses a hybrid vehicle including an internal combustion engine, a drive motor, a generator motor, and a power split device. In the hybrid vehicle, an output from the internal combustion engine is divided by the power split device into a power for generating electricity and a power for driving. The generator motor generates electricity using the power for generating electricity resulting from the division by the power split device (see JP 2003-328804 A).

In such a hybrid vehicle as described above, even when the drive motor fails, limp-home driving can be performed by driving the internal combustion engine. At this time, when an amount of electricity stored in an electricity storage device that stores the electric power for driving decreases, the amount of electricity generated by the generator motor is increased to charge the electricity storage device. Since an output power from the internal combustion engine is increased to increase the amount of electricity generated by the generator motor, the rotation speed of the internal combustion engine increases. In such a case, when the driving force required for the hybrid vehicle decreases, if the rotation speed of the internal combustion engine increases to charge the electricity storage device, drivability deteriorates.

SUMMARY OF THE INVENTION

In view of the problem described above, this invention provides a control device for a hybrid vehicle which can improve drivability during limp-home driving and the hybrid vehicle provided with the same. This invention further provides a control method for the hybrid vehicle that can improve the drivability during the limp-home driving.

In accordance with an aspect of this invention, a control device for a hybrid vehicle including an internal combustion engine, a first rotating electric machine, a second rotating electric machine, a planetary gear, and an electricity storage device is provided. The second rotating electric machine drives a drive shaft. The planetary gear is mechanically coupled to an output shaft of the internal combustion engine, to a rotating shaft of the first rotating electric machine, and to the drive shaft. The electricity storage device is configured to give/receive an electric power to/from the first and second rotating electric machines. The control device includes a controller. The controller is configured, to set a drive mode to a limp home mode in which the internal combustion engine and the first rotating electric machine are driven to drive the hybrid vehicle, when an abnormality in the second rotating electric machine is sensed, the controller being configured to set, the smaller one of a second charge/discharge amount and a third charge/discharge amount as a charge/discharge demand, in a case where a first charge/discharge amount is smaller than a second charge/discharge amount during the limp home mode, the first charge/discharge amount is a charge/discharge amount that is input/output to/from the electricity storage device when the internal combustion engine is operated so as to generate a driving force required for the hybrid vehicle, the second charge/discharge amount is based on a charged state of the electricity storage device, and the third charge/discharge amount is based on an upper-limit rotation speed of the internal combustion engine that is set in accordance with a torque transmitted by the drive shaft. The controller is configured to control the internal combustion engine and the first rotating electric machine such that the electricity storage device receives/outputs an electric power in accordance with the set charge/discharge demand.

In the control device, the controller may also set the upper-limit rotation speed lower as the torque transmitted by the drive shaft is smaller. Alternatively, the controller may also be configured to control the internal combustion engine and the first rotating electric machine such that the electricity storage device receives/outputs the electric power in accordance with the charge/discharge demand, while maintaining an output torque from the internal combustion engine at a value of the required driving force.

In the control device, the controller may also be configured to set the third charge/discharge amount smaller as the upper-limit rotation speed is lower. Alternatively, the controller may also be configured to set the second charge/discharge amount smaller as a state amount showing the charged state of the electricity storage device is larger.

In the control device, the controller may also be configured to set the first charge/discharge amount on the basis of the required driving force and a predetermined operating line for setting an operating point of the internal combustion engine. Here, the predetermined operating line represents a relationship between a rotation speed of the internal combustion engine and a torque that can be output from the internal combustion engine.

In the control device, the controller may also be configured to set the first charge/discharge amount as the charge/discharge demand when the first charge/discharge amount is equal to or larger than the second charge/discharge amount.

In accordance with another aspect of this invention, the hybrid vehicle provided with any of the control devices described above is provided.

In accordance with still another aspect of this invention, a control method for a hybrid vehicle as shown below is provided. The hybrid vehicle is a vehicle including an internal combustion engine, a first rotating electric machine, a second rotating electric machine, a planetary gear, and an electricity storage device. The planetary gear is mechanically coupled to an output shaft of the internal combustion engine, to a rotating shaft of the first rotating electric machine, and to the drive shaft. The electricity storage device is configured to give/receive an electric power to/from the first and second rotating electric machines. In the control method described above, a drive mode is set to a limp home mode in which the internal combustion engine and the first rotating electric machine are driven to drive the hybrid vehicle, when an abnormality in the second rotating electric machine is sensed. In a case where a first charge/discharge amount is smaller than a second charge/discharge amount during the limp home mode, the smaller one of the second charge/discharge amount and a third charge/discharge amount is set as a charge/discharge demand, the first charge/discharge amount is a charge/discharge amount that is input/output to/from the electricity storage device when the internal combustion engine is operated so as to generate a driving force required for the hybrid vehicle, the second charge/discharge amount is based on a charged state of the electricity storage device, and the third charge/discharge amount is based on an upper-limit rotation speed of the internal combustion engine that is set in accordance with a torque transmitted by the drive shaft. The internal combustion engine and the first rotating electric machine are controlled such that the electricity storage device receives/outputs an electric power in accordance with the charge/discharge demand.

Thus, in the control device for a hybrid vehicle and the control method therefor each described above, the charge/discharge demand for the electricity storage device during the limp home mode is set, and the internal combustion engine and the first rotating electric machine are controlled such that the electricity storage device receives/outputs the electric power in accordance with the set charge/discharge demand. In the case where the first charge/discharge amount that is input/output to/from the electricity storage device when the internal combustion engine is operated so as to generate the driving force required for the hybrid vehicle is smaller than the second charge/discharge amount based on the charged state of the electricity storage device, the smaller one of the second charge/discharge amount and the third charge/discharge amount based on the upper-limit rotation speed of the internal combustion engine that is set in accordance with the required driving force is set as the charge/discharge demand. By thus setting the charge/discharge demand, it is possible to inhibit the rotation speed of the internal combustion engine from increasing despite a reduction in required driving force. Therefore, with the control device for a hybrid vehicle, the hybrid vehicle provided with the same, and the control method for the hybrid vehicle each described above, drivability during the limp-home driving of the vehicle can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
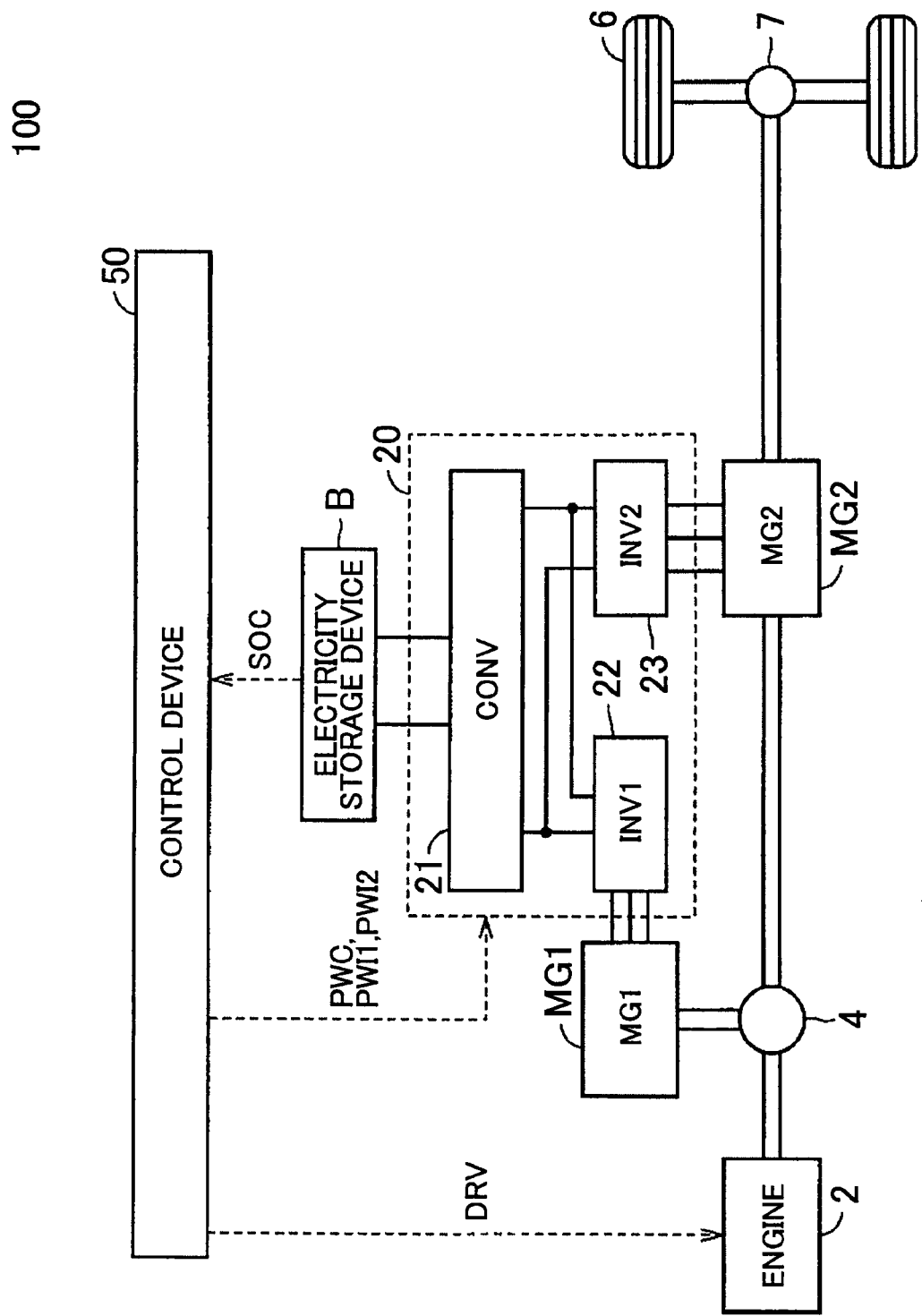
FIG. 1 is a block diagram showing an overall configuration of a hybrid vehicle to which a control device according to an embodiment of this invention is applied.

Referring to the drawings, an embodiment of this invention will be described below in detail. In the drawings, the same or corresponding parts are designated, by the same reference numerals, and the description thereof will not be repeated.

FIG. 1 is a block diagram showing an overall configuration of a hybrid vehicle to which a control device according to the embodiment of this invention is applied. Referring to FIG. 1, a hybrid vehicle 100 includes an engine 2, motor generators MG1 and MG2, a power split device 4, a drive wheel 6, and a decelerator 7. The hybrid vehicle 100 further includes an electricity storage device B, a power control unit (PCU) 20, and a control device 50.

The hybrid vehicle 100 is driven using each of the engine 2 and the motor generator MG2 as a power source. The driving force generated from the engine 2 and the motor generator MG2 is transmitted to the drive wheel 6 via the decelerator 7.

The engine 2 is an internal combustion engine that burns a fuel to output a power, such as a gasoline engine or a diesel engine. The engine 2 is configured to allow driving conditions such as a throttle valve opening (suction air amount), an amount of fuel supply, and an ignition time to be electrically controlled with a signal DRV from the control device 50.

The motor generators MG1 and MG2 are alternating current (AC) rotating electric machines which are, e.g., 3-phase AC synchronous motors. The motor generator MG1 is used as a power generator driven by the engine 2 and is also used as a rotating electric machine capable of activating the engine 2. The electric power obtained through the generation of electricity by the motor generator MG1 can be used to charge the electricity storage device B and can also be used to drive the motor generator MG2. The motor generator MG2 is used mainly as a rotating electric machine that drives the drive wheel 6 of the hybrid vehicle 100.

The power split device 4 includes a planetary gear mechanism having, e.g., the three rotating shafts of a sun gear, a carrier, and a ring gear. The sun gear is coupled to the rotating shaft of the motor generator MG1. The carrier is coupled to the crankshaft of the engine 2. The ring gear is coupled to a drive shaft. The power split device 4 divides the driving force of the engine 2 into a power to be transmitted to the rotating shaft of the motor generator MG1 and a power to be transmitted to the drive shaft. The drive shaft transmits the driving force to the drive wheel 6. The drive shaft is coupled also to the rotating shaft of the motor generator MG2. When the rotations of two of the three rotating shafts of the power split device 4 are determined, the rotation of the remaining one rotating shaft is consequently determined.

The electricity storage device B is a direct current (DC) power source capable of being charged/discharged and is formed of, e.g., a secondary battery such as a nickel-hydrogen battery or a lithium battery, a capacitor, or the like. The electricity storage device B supplies an electric power to the PCU 20 and is charged with the electric power from the PCU 20 during power regeneration. The electricity storage device B outputs a signal showing a state amount (hereinafter referred to also as state of charge (SOC) showing the charged state of the electricity storage device B to the control device 50. Note that the SOC of the electricity storage device B can be calculated by various conventional methods using an output voltage or current from the electricity storage device B.

The PCU 20 includes a converter 21, an inverter 1 22, and an inverter 2 23. The converter 21 is controlled with a signal PWC from the control device 50. The converter 21 increases the voltage from the electricity storage device B and supplies the increased voltage to the inverters 1 22 and 2 23. The converter 21 also reduces the voltage generated by the motor generators MG1 and MG2 and rectified in the inverters 1 22 and 2 23 to charge the electricity storage device B.

The inverters 1 22 and 2 23 are connected in parallel with each other to the converter 21. The inverters 1 22 and 2 23 are controlled by signals PWI1 and PWI2 from the control device 50. The inverters 1 22 and 2 23 convert a DC electric power supplied from the converter 21 to an AC electric power to drive the respective motor generators MG1 and MG2.

The control device 50 determines a target driving force to be transmitted to the drive wheel 6 on the basis of an accelerator depression amount, an amount of brake pedal depression, the speed of the hybrid vehicle, or the like. The control device 50 controls the engine 2 and the motor generators MG1 and MG2 so as to provide an operation state which allows the target driving force to be output.

When an abnormality occurs in the motor generator MG2 in a configuration as described above, limp-mode driving control is executed. The following is a description of the limp-home driving control.

Figure 2:
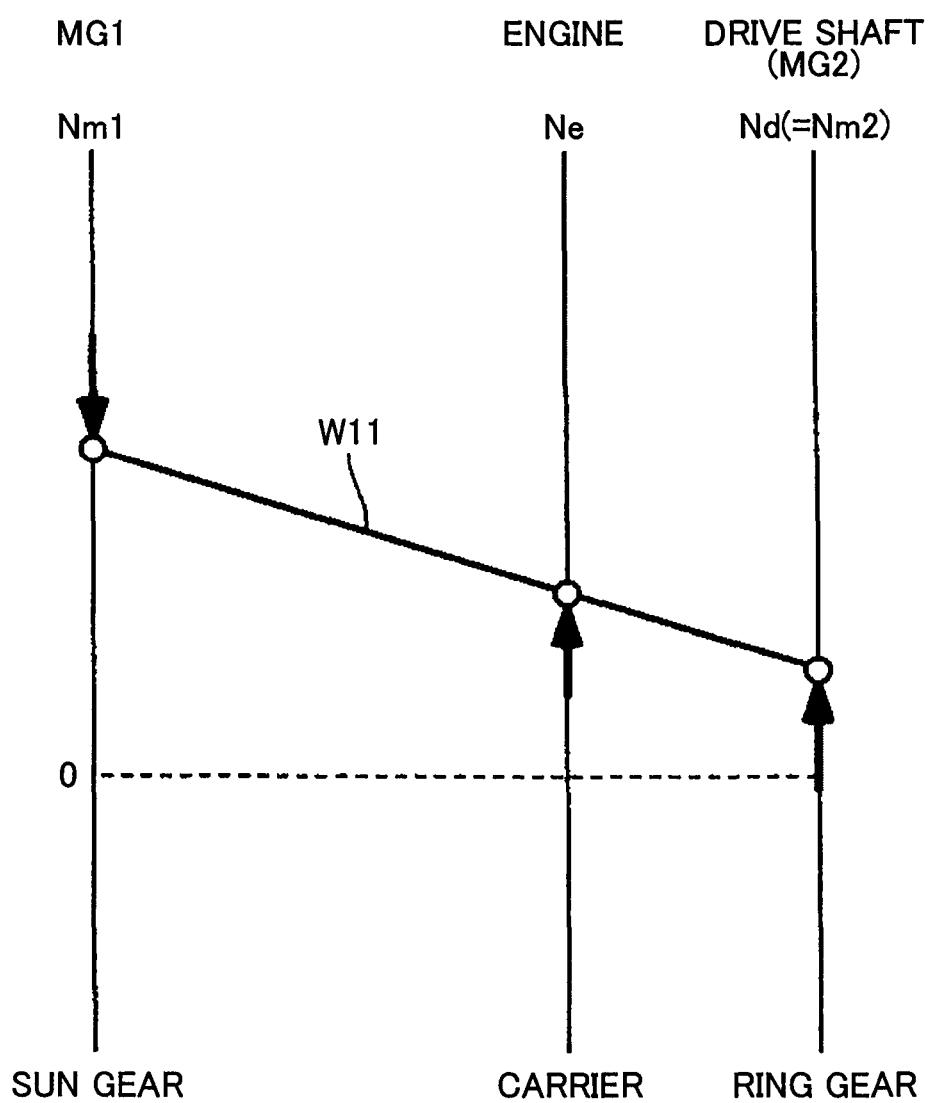
FIG. 2 is a collinear chart of a power split device showing the relations among the rotation speeds of individual members during limp-home driving in the power split device shown in FIG. 1.

FIG. 2 is a view showing a collinear chart of the power split device 4 during limp-home driving. In FIG. 2 is shown the state of the sun gear (coupled to the rotating shaft of the motor generator MG1), the carrier (coupled to the output shaft of the engine 2), and the ring gear (coupled to the drive shaft) each included in the power split device 4. Note that the rotation speed of the drive shaft is the same as the rotation speed of the motor generator MG2. The ordinate axis in FIG. 2 shows the rotation speeds of the corresponding elements.

Referring to FIG. 1 in conjunction with FIG. 2, a rotation speed Ne of the engine 2, a rotation speed Nm1 of the motor generator MG1, and a rotation speed Nd of the drive shaft (a rotation speed Nm2 of the motor generator MG2) are in a relation in which they are connected by the straight line in the collinear chart (solid line W11 of FIG. 2).

When an abnormality occurs in the motor generator MG2, the hybrid vehicle 100 can be driven using the torque (hereinafter referred to also as an "engine direct torque") transmitted from the engine 2 to the drive shaft via the power split device 4. Such driving is hereinafter referred to as "engine direct driving". The engine 2 is operated so as to obtain a required driving force from a driver.

In the engine direct driving, to maintain the rotation speed Ne of the engine 2 at a desired rotation speed, it is necessary to drive the motor generator MG1. Specifically, when the rotation speed of the motor generator MG1 is positive, the motor generator MG1 is regeneratively driven. The electric power generated by the regenerative driving of the motor generator MG1 is stored in the electricity storage device B. When the rotation speed of the motor generator MG1 is negative, the motor generator MG1 is driven by power running. At this time, the motor generator MG1 is driven by power running with the electric power supplied from the electricity storage device B.

Here, when the SOC of the electricity storage device B is over an upper limit value, the electricity storage device B cannot be charged while, when the SOC of the electricity storage device B is under a lower limit value, the electricity storage device B cannot be discharged. In this case, since the operation of the motor generator MG1 is limited, it becomes difficult to continue the regenerative driving.

To eliminate the difficulty, it can be considered to change the operating points of the engine 2 and the motor generator MG1 during the engine direct driving and thereby control a charge/discharge amount for the electricity storage device B. Specifically, when the required driving force decreases, an output power from the engine 2 is changed while an output torque from the engine 2 is maintained to be able to control the charge/discharge amount for the electricity storage device B, while maintaining the required driving force. This allows the SOC of the electricity storage device B to be controlled to fall within a predetermined range. At this time, the target torque of the engine 2 is determined on the basis of the required driving force, while the target rotation speed of the engine 2 is determined on the basis of the SOC of the electricity storage device B.

However, when the target rotation speed of the engine 2 is determined on the basis of the SOC of the electricity storage device B, the rotation speed of the engine 2 may increase despite a reduction in required driving force. As a result, the driver may have a strange feeling.

Accordingly, in this embodiment, a charge/discharge demand for the electricity storage device B during a limp home mode is set, and the engine 2 and the motor generator MG1 are controlled such that the electricity storage device B receives/outputs an electric power in accordance with the set charge/discharge demand. When a charge/discharge amount X based on the driving force required for the hybrid vehicle 100 is smaller than a charge/discharge amount Y based on the SOC of the electricity storage device B, the smaller one of the charge/discharge amount Y and a charge/discharge amount Z based on the upper-limit rotation speed of the engine 2 is set as the charge/discharge demand. This can inhibit the rotation speed of the engine 2 from increasing despite a reduction in required driving force. Consequently, it is possible to improve drivability during the limp-home driving.

Figure 3:
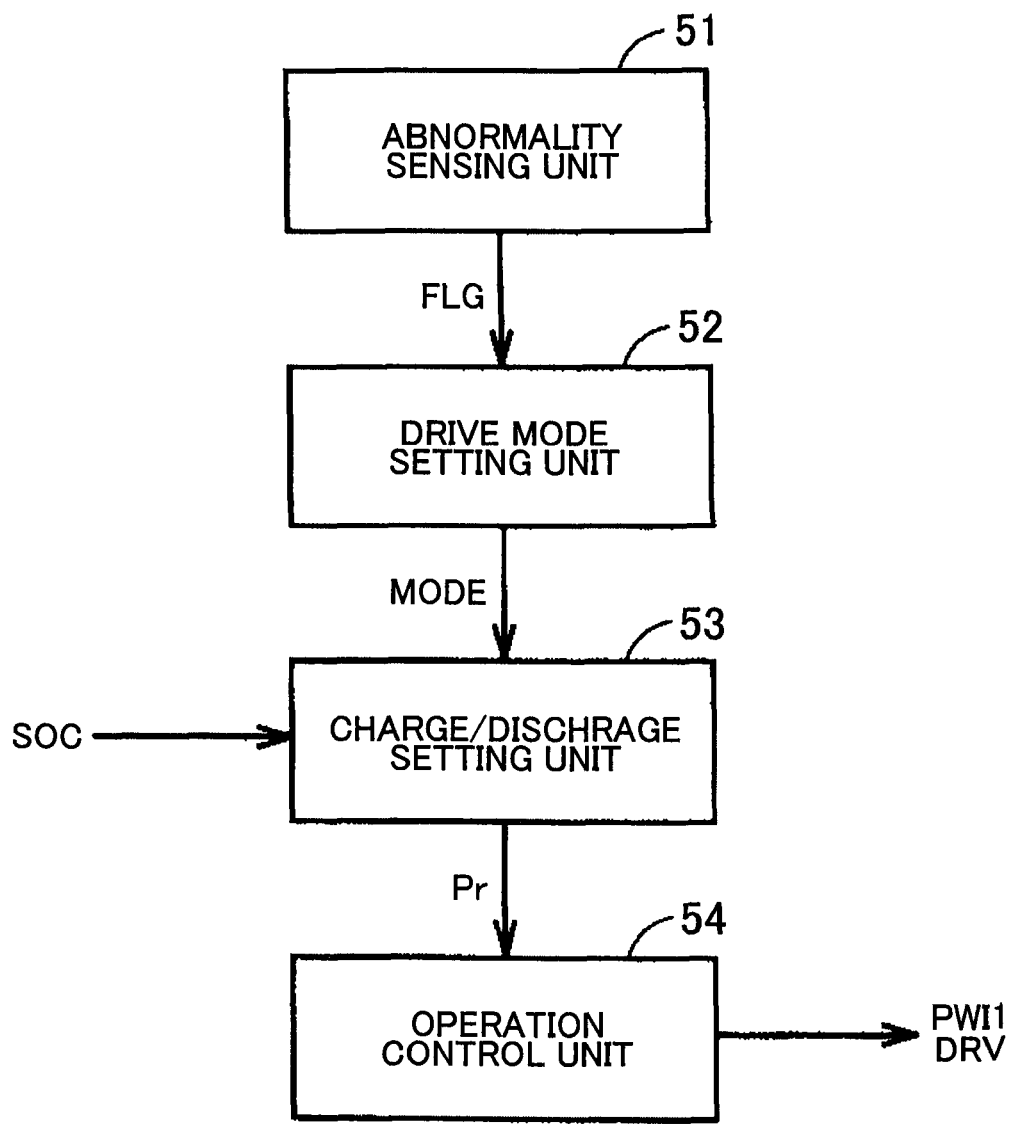
FIG. 3 is a functional block diagram related to limp-home driving control by the control device shown in FIG. 1.

FIG. 3 is a functional block diagram related to the limp-home driving control by the control device 50 shown in FIG. 1. Referring to FIG. 3, the control device 50 includes an abnormality sensing unit 51, a drive mode setting unit 52, a charge/discharge setting unit 53, and an operation control unit 54.

The abnormality sensing unit 51 senses an abnormality in the motor generator MG2. Specifically, in such a case where the current flowing in the motor generator MG2 cannot be controlled into a desired state or where the temperature of the motor generator MG2 is over an upper limit value, the abnormality sensing unit 51 determines that an abnormality has occurred in the motor generator MG2. The abnormality sensing unit 51 outputs a signal FLG showing the state of the motor generator MG2 to the drive mode setting unit 52.

When the signal FLG received from the abnormality sensing unit 51 shows that an abnormality has occurred in the motor generator MG2, the drive mode setting unit 52 sets the drive mode to the limp home mode. The drive mode setting unit 52 outputs a signal MODE showing the drive mode to the charge/discharge setting unit 53.

The charge/discharge setting unit 53 sets the charge/discharge demand for the electricity storage device B. Specifically, the charge/discharge setting unit 53 calculates the charge/discharge amount X based on the driving force required for the hybrid vehicle 100, the charge/discharge amount Y based on the SOC of the electricity storage device B, and the charge/discharge amount Z based on the upper-limit rotation number of the engine 2. When the charge/discharge amount X is smaller than the charge/discharge amount Y, the charge/discharge setting unit 53 sets, as the charge/discharge demand, the smaller one of the charge/discharge amount Y and the charge/discharge amount Z. The charge/discharge setting unit 53 outputs the set charge/discharge demand to the operation control unit 54. Note that the positive charge/discharge amounts X, Y, and Z show that the electricity storage device B is to be charged and the negative charge/discharge amounts X, Y, and Z show that the electricity storage device B is to be discharged. A method of calculating the charge/discharge amounts X, Y, and Z will be described later in detail.

The operation control unit 54 receives the charge/discharge demand from the charge/discharge setting unit 53. The operation control unit 54 controls the engine 2 and the motor generator MG1 such that the electricity storage device B receives/outputs an electric power in accordance with the charge/discharge demand, while maintaining the output torque from the engine 2 during the limp home mode. Specifically, the operation control unit 54 assumes that the total sum of a drive power, the charge/discharge demand, and an auxiliary device loss is a target output power from the engine 2. The operation control unit 54 calculates a target output torque from the engine 2 on the basis of the target driving force of the hybrid vehicle 100. Then, the operation control unit 54 calculates the target rotation speed of the engine 2 on the basis of the target output power and the target output torque. The operation control unit 54 controls the motor generator MG1 such that the rotation speed of the engine 2 is equal to the target rotation speed.

The operation control unit 54 generates the signal PWI1 for controlling the motor generator MG1 and outputs the signal PWI1 to the PCU 20 and also generates the signal DRV for controlling the engine 2 and outputs the signal DRV to the engine 2.

Thus, in the present embodiment, the operating points of the engine 2 are set on the basis of the charge/discharge demand for the electricity storage device B to allow the limp-home driving based on the required driving force, the SOC of the electricity storage device B, and the upper-limit rotation speed of the engine 2 to be executed. The setting of the charge/discharge demand will be described below in detail.

Figure 4:
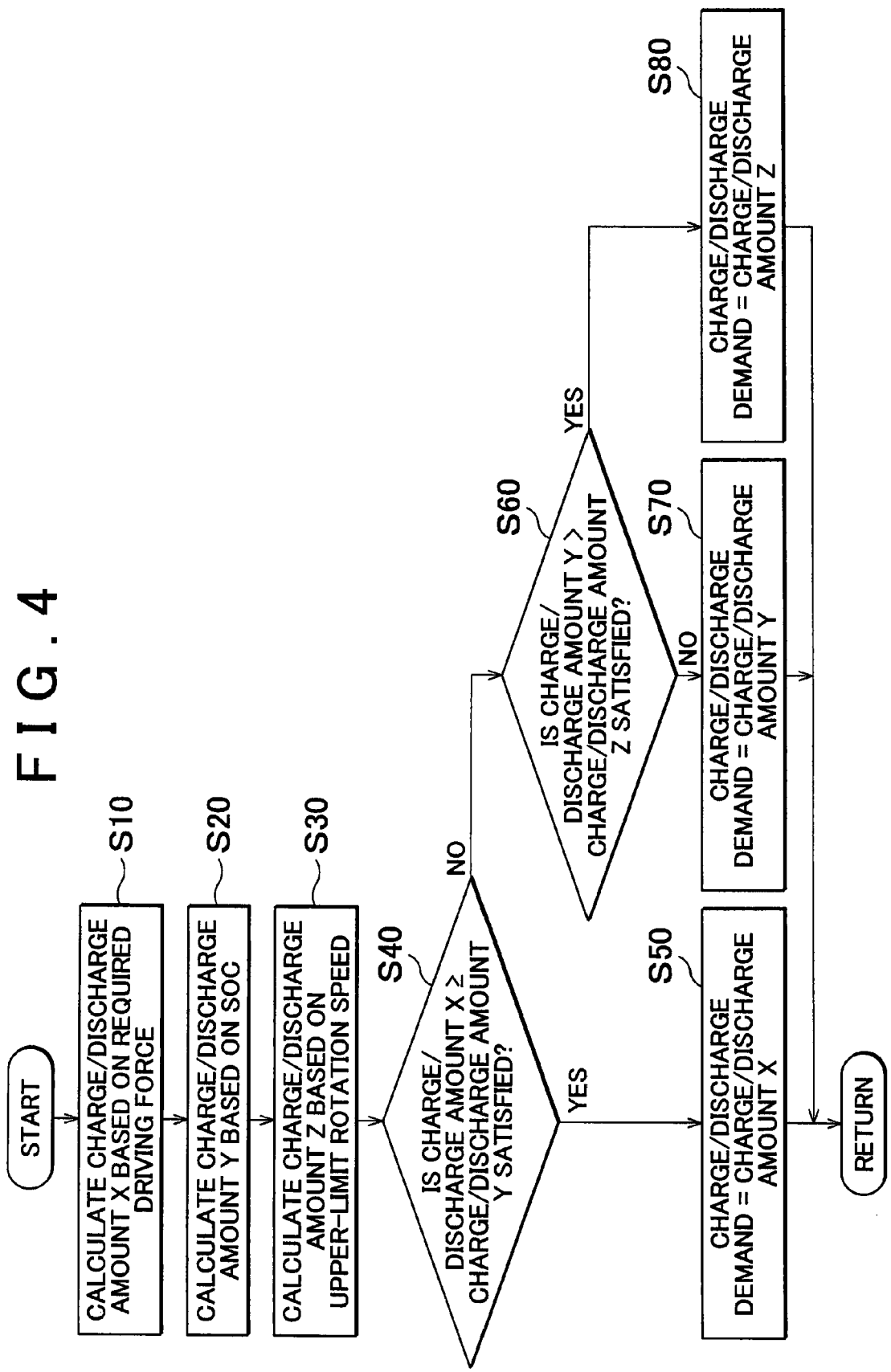
FIG. 4 is a flow chart showing a control structure for processing executed by the charge/discharge setting unit shown in FIG. 3.

FIG. 4 is a flow chart showing a control structure for processing executed by the charge/discharge setting unit 53 shown in FIG. 3. Note that each of the steps in the flow chart shown in FIG. 4 is implemented as a result of calling a program stored in advance in the control device 50 from a main routine and executing the program in response to the establishment of a predetermined cycle period or a predetermined condition. Alternatively, it is also possible to construct a dedicated hardware item (electronic circuit) and implement the processing.

Referring to FIG. 4, the charge/discharge setting unit 53 calculates the charge/discharge amount X based on the required driving force in step S10.

Figure 5:
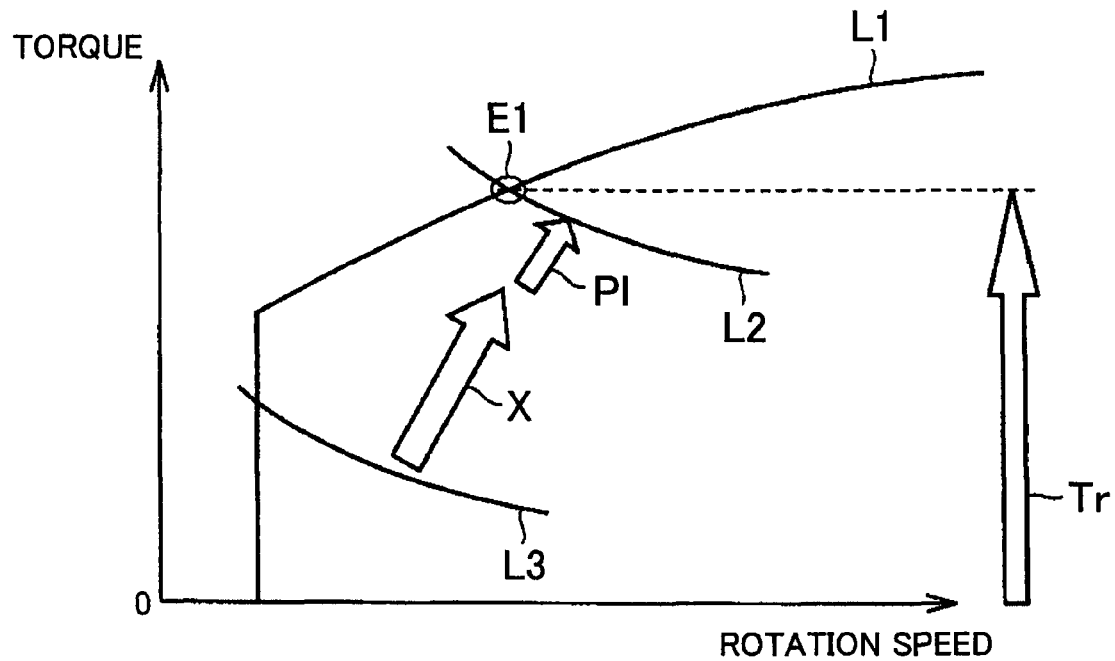
FIG. 5 is a view for illustrating a method of calculating a charge/discharge amount based on a required driving force, which is a view showing the case where the charge/discharge amount is positive.
Figure 6:
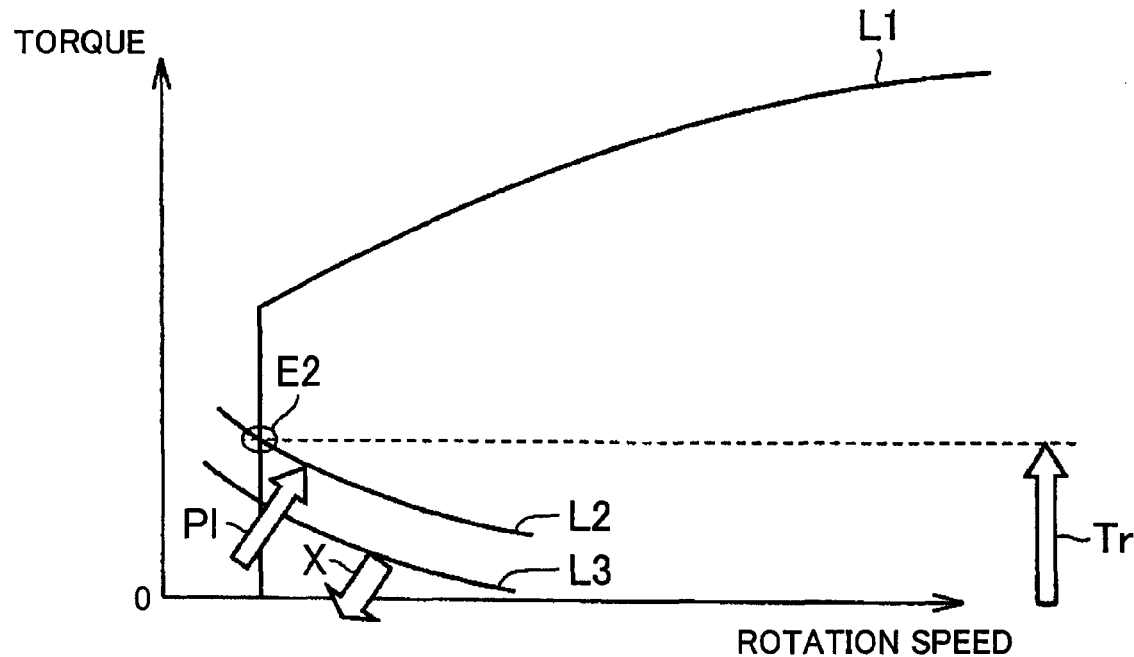
FIG. 6 is a view for illustrating the method of calculating the charge/discharge amount based on the required driving force, which is a view showing the case where the charge/discharge amount is negative.

FIGS. 5 and 6 are views each for illustrating a method of calculating the charge/discharge amount based on the required driving force. Referring to FIGS. 5 and 6, a predetermined operating line L1 is the operation line set in a coordinate plane in which the ordinate axis represents the torque of the engine 2 and the abscissa axis represents the rotation speed of the engine 2. The operating line L1 represents the relationship between the rotation speed of the engine 2 and the torque that can be output. An equi-power line L2 shows the equi-power line of an output power Pe at operating points E1 and E2 of the engine 2. An equi-power line L3 shows the equi-power line of a drive power Pv of the hybrid vehicle 100.

The charge/discharge setting unit 53 calculates a required driving force Tr converted into the torque of the engine shaft on the basis of the target driving force of the hybrid vehicle 100. The charge/discharge setting unit 53 assumes that the points in the operating line L1 which correspond to the required driving force Tr are the operating points E1 and E2. The charge/discharge setting unit 53 calculates the charge/discharge amount X in accordance with the following expression.

$$\text{Charge/Discharge Amount } X = \text{Output Power } Pe - \text{Drive Power } Pv - \text{Auxiliary Device Loss } P1 \quad (1)$$

wherein Drive Power Pv represents the power used to drive the hybrid vehicle 100 and calculated as the product of the torque transmitted by the drive shaft of the hybrid vehicle 100 and the rotation speed of the drive shaft, and Auxiliary Device Loss P1 includes, e.g., a power for driving an air conditioner and a power for driving a DC/DC converter that supplies an electric power to an auxiliary device.

Here, FIG. 5 shows an example of the case where the charge/discharge amount X is positive, i.e., the case where the electricity storage device B is to be charged. FIG. 6 shows an example of the case where the charge/discharge amount X is negative, i.e., the case where the electricity storage device B is to be discharged. Thus, as the required driving force is larger, the charge/discharge amount X has a larger value.

Figure 7:
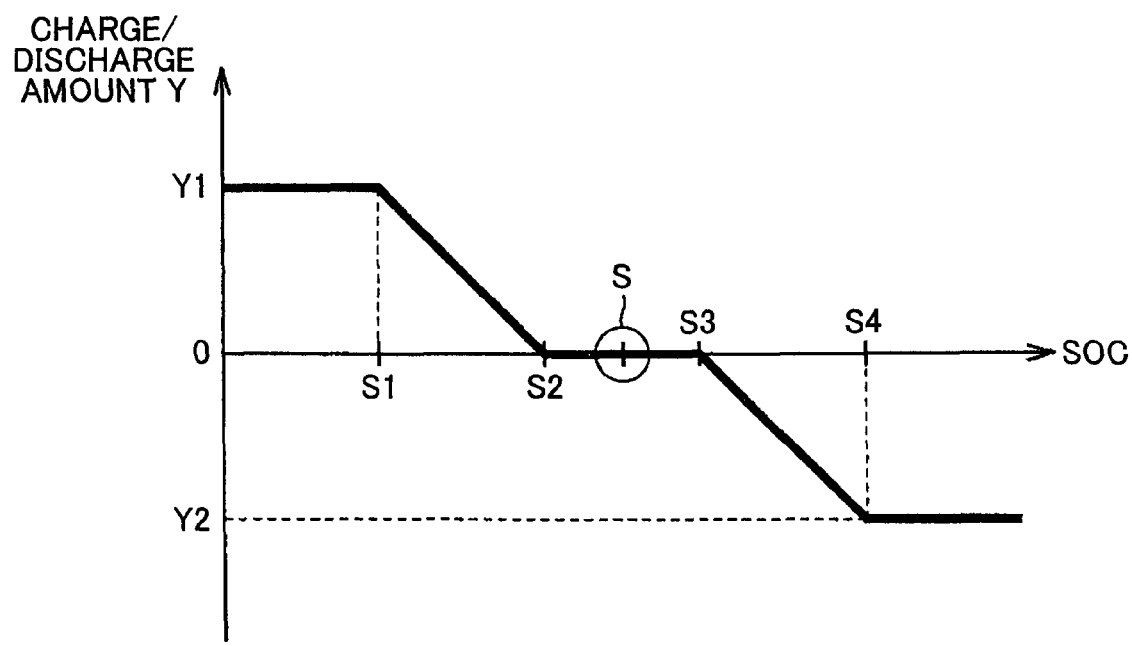
FIG. 7 is a view for illustrating a method of calculating a charge/discharge amount based on a state amount showing the charged state of the electricity storage device shown in FIG. 1.

Referring again to FIG. 4, subsequently to step S10, the charge/discharge setting unit 53 calculates the charge/discharge amount Y based on the SOC of the electricity storage device B (step S20). Specifically, the charge/discharge setting unit 53 sets the charge/discharge amount Y smaller as the SOC of the electricity storage device is larger (FIG. 7). By way of example, when the SOC of the electricity storage device B is smaller than S1, the charge/discharge amount Y is set to Y1. The charge/discharge amount Y is set to decrease from Y1 to zero as the SOC of the electricity storage device B increases from S1 to S2. When the SOC of the electricity storage device B is between S2 and S3, the charge/discharge amount Y is set to zero. The charge/discharge amount Y is set to decrease from zero to Y2 as the SOC of the electricity storage device B increases from S3 to S4. When the SOC of the electricity storage device B is larger than S4, the charge/discharge amount Y is set to Y2.

Figure 8:
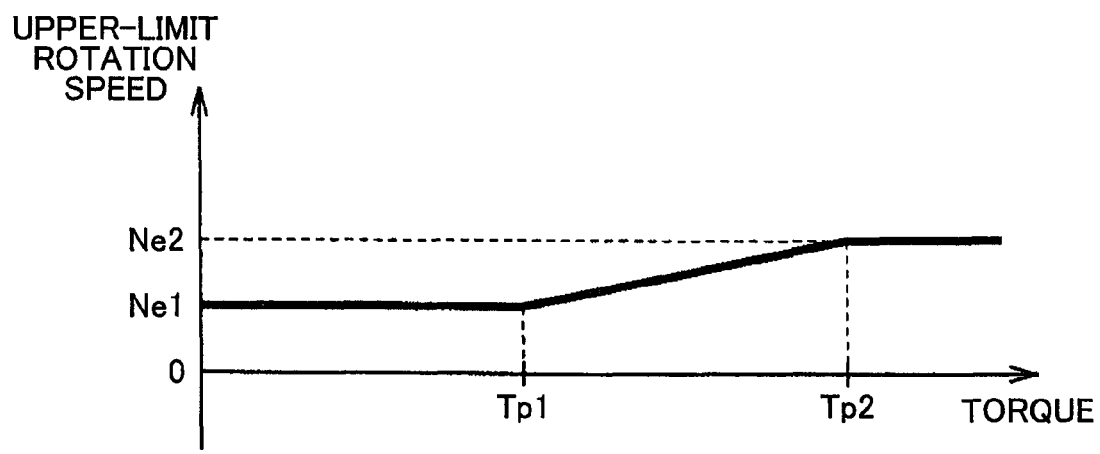
FIG. 8 is a view for illustrating a method of calculating a charge/discharge amount based on the upper-limit rotation speed of an internal combustion engine.

Subsequently to step S20, the charge/discharge setting unit 53 calculates the charge/discharge amount Z based on the upper-limit rotation speed of the engine 2 (step S30). Specifically, the charge/discharge setting unit 53 sets the charge/discharge amount Z smaller as the upper-limit rotation speed of the engine 2 is lower. The charge/discharge setting unit 53 calculates the charge/discharge amount Z in accordance with the following expression.

$$\text{Charge/Discharge Amount } Z = (\text{Upper-Limit Rotation Speed } Neu \times \text{Engine Torque } Te) - \text{Drive Power } Pv - \text{Auxiliary Device Loss } P1 \quad (2)$$

wherein Upper-Limit Rotation Speed Neu is calculated in accordance with a torque Tp of the drive shaft (FIG. 8). By way of example, when the torque Tp of the drive shaft is smaller than Tp1, the upper-limit rotation speed Neu is set to Ne1. The upper-limit rotation speed Neu is set so as to increase from Ne1 to Ne2 as the torque Tp of the drive shaft increases from Tp1 to Tp2. When the torque Tp of the drive shaft is larger than Tp2, the upper-limit rotation speed Neu is set to Ne2.

Subsequently to step S30, the charge/discharge setting unit 53 determines whether or not the charge/discharge amount X is larger than the charge/discharge amount Y (step S40). When it is determined that the charge/discharge amount X is equal to or larger than the charge/discharge amount Y (YES in step S40), the charge/discharge setting unit 53 sets the charge/discharge amount X as the charge/discharge demand (step S50).

By way of example, when the charge/discharge amount X is positive as shown in FIG. 5 and the charge/discharge amount Y is zero as shown in FIG. 7 (when the SOC of the electricity storage device B is S), the charge/discharge amount X is set as the charge/discharge demand. As a result, the operation control unit 54 (FIG. 3) controls the engine 2 and the motor generator MG1 such that the engine 2 operates at the operating point E1 (FIG. 5).

On the other hand, when the charge/discharge amount X is determined to be smaller than the charge/discharge amount Y (NO in step S40), the charge/discharge setting unit 53 determines whether or not the charge/discharge amount Y is larger than the charge/discharge amount Z (step S60). When the charge/discharge amount Y is determined to be not more than the charge/discharge amount Z (NO in step S60), the charge/discharge setting unit 53 sets the charge/discharge amount Y as the charge/discharge demand (step S70).

Figure 9:
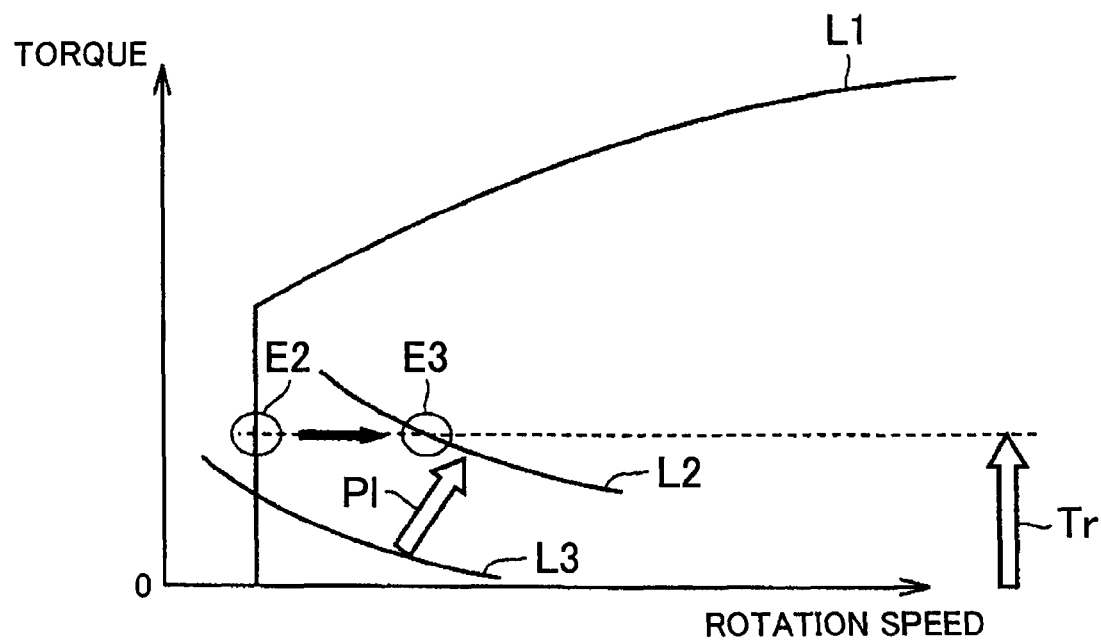
FIG. 9 is a view showing an example of the setting of the operating point of the internal combustion engine in accordance with a charge/discharge demand.

By way of example, when the charge/discharge amount X is negative as shown in FIG. 6 and the charge/discharge amount Y is zero (when the SOC of the electricity storage device B is S) as shown in FIG. 7 and when the charge/discharge amount Y is not more than the charge/discharge amount Z, the charge/discharge amount Y is set as the charge/discharge demand. As a result, the operation control unit 54 (FIG. 3) controls the engine 2 and the motor generator MG1 such that the engine 2 operates at an operating point E3 (FIG. 9). At this time, the rotation speed at the operating point E3 is higher than the rotation speed at the operating point E2. Accordingly, the output power from the engine 2 increases.

On the other hand, when the charge/discharge amount Y is determined to be larger than the charge/discharge amount Z (YES in step S60), the charge/discharge setting unit 53 sets the charge/discharge amount Z as the charge/discharge demand (step S80).

Figure 10:
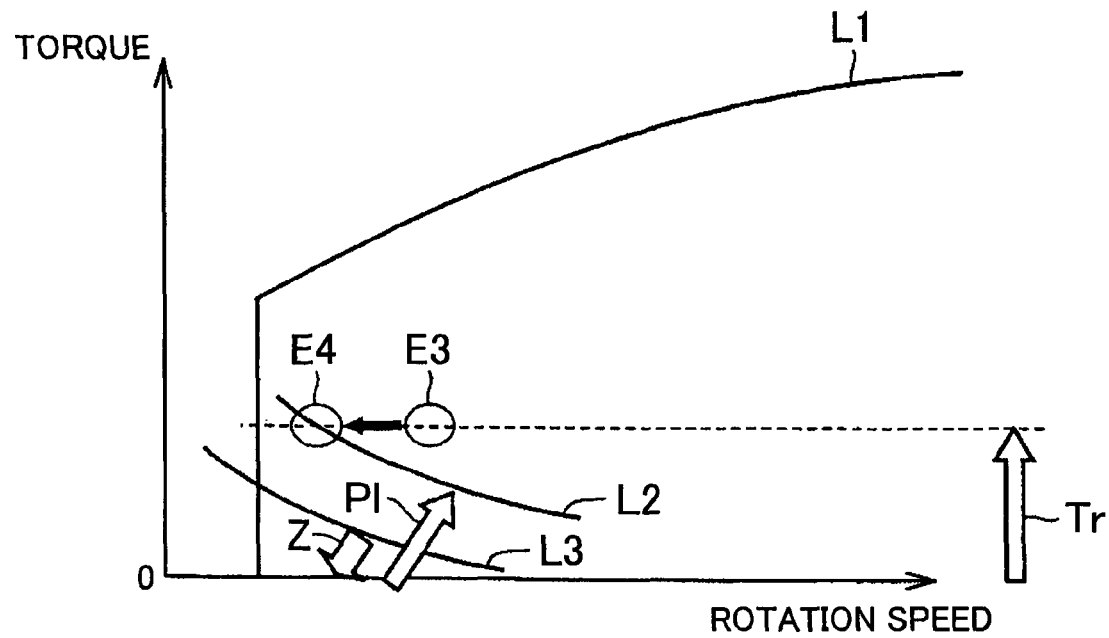
FIG. 10 is a view showing an example of the setting, of the operating point of the internal combustion engine in accordance with the charge/discharge demand.

By way of example, when charge/discharge amount X is negative as shown in FIG. 6 and the charge/discharge amount Y is zero (when the SOC of the electricity storage device B is S) as shown in FIG. 7 and when the charge/discharge amount Y is larger than the charge/discharge amount Z, the charge/discharge amount Z is set as the charge/discharge demand. As a result, the operation control unit 54 (FIG. 3) controls the engine 2 and the motor generator MG1 such that the engine 2 operates at an operating point E4 (FIG. 10). At this time, the rotation speed at the operating point E4 is lower than the rotation speed at the operating point E3. As a result, the rotation speed of the engine 2 is inhibited from increasing.

Thus, in this embodiment, the charge/discharge demand for the electricity storage device B during the limp home mode is set, and the engine 2 and the motor generator MG1 are controlled such that the electricity storage device B receives/outputs an electric power in accordance with the set charge/discharge demand. In the case where the charge/discharge amount X that is input/output to/from the electricity storage device B when the engine 2 is operated so as to generate the driving force required for the hybrid vehicle 100 is smaller than the charge/discharge amount Y based on the charged state of the electricity storage device B, the smaller one of the charge/discharge amount Y and the charge/discharge amount Z based on the upper-limit rotation speed of the engine 2 that is set in accordance with the required driving force is set as the charge/discharge demand. By thus setting the charge/discharge demand, it is possible to inhibit the rotation speed of the engine 2 from increasing despite a reduction in required driving force. Therefore, according to this embodiment, drivability during the limp-home driving can be improved.

In the above, it is assumed that the charge/discharge amount Y is calculated on the basis of the SOC of the electricity storage device B. However, instead of the SOC of the electricity storage device B, a state amount showing the charged state of the electricity storage device B can be used. The state amount showing the charged state of the electricity storage device B is, e.g., a value which allows the capacity of the battery to be measured, such as a voltage value in the electricity storage device B.

Note that, in the foregoing embodiment, the description has been given of the hybrid vehicle 100 including the converter 21. However, a configuration not including the converter 21 may also be used.

Note that, in the above, the motor generators MG1 and MG2 correspond to a "first rotating electric machine" and a "second rotating electric machine" in this invention, and the engine 2 corresponds to an "internal combustion engine" in this invention. Also, the power split device 4 corresponds to an embodiment of a "planetary gear" in this invention.

It should be understood that the embodiments disclosed herein are not by way of limitation by way of illustration in all respects. The scope of the invention is defined by claims, not by the above description, and all changes that fall within contains the equivalent meaning and scope to the claims.

The invention claimed is:

1. A control device for a hybrid vehicle, the hybrid vehicle including an internal combustion engine, a first rotating electric machine, a second rotating electric machine, a planetary gear, and an electricity storage device, the second rotating electric machine being configured to drive a drive shaft, the planetary gear being mechanically coupled to an output shaft of the internal combustion engine, to a rotating shaft of the first rotating electric machine, and to the drive shaft, the electricity storage device being configured to give/receive an electric power to/from the first and second rotating electric machines, the control device comprising:
   a controller configured to set a drive mode to a limp home mode in which the internal combustion engine and the first rotating electric machine are driven to drive the hybrid vehicle, when an abnormality in the second rotating electric machine is sensed, the controller being configured to set the smaller one of a second charge/discharge amount and a third charge/discharge amount as a charge/discharge demand, in a case where a first charge/discharge amount is smaller than a second charge/discharge amount during the limp home mode, the first charge/discharge amount being a charge/discharge amount that is input/output to/from the electricity storage device when the internal combustion engine is operated so as to generate a driving force required for the hybrid vehicle, the second charge/discharge amount being based on a charged state of the electricity storage device, and the third charge/discharge amount being based on an upper-limit rotation speed of the internal combustion engine that is set in accordance with a torque transmitted by the drive shaft, and the controller being configured to control the internal combustion engine and the first rotating electric machine such that the electricity storage device receives/outputs an electric power in accordance with the set charge/discharge demand.

2. The control device for a hybrid vehicle according to claim 1, wherein the controller is configured to set the upper-limit rotation speed lower as the torque transmitted by the drive shaft is smaller.

3. The control device for a hybrid vehicle according to claim 1, wherein the controller is configured to control the internal combustion engine and the first rotating electric machine such that the electricity storage device receives/outputs the electric power in accordance with the charge/discharge demand, while maintaining an output torque from the internal combustion engine at a value of the required driving force.

4. The control device for a hybrid vehicle according to claim 1, wherein the controller is configured to set the third charge/discharge amount smaller as the upper-limit rotation speed is lower.

5. The control device for a hybrid vehicle according to claim 1, wherein the controller is configured to set the second charge/discharge amount smaller as a state amount showing the charged state of the electricity storage device is larger.

6. The control device for a hybrid vehicle according to claim 1, wherein the controller is configured to set the first charge/discharge amount on the basis of the required driving force and a predetermined operating line for setting an operating point of the internal combustion engine, the predetermined operating line representing a relationship between a rotation speed of the internal combustion engine and a torque that can be output from the internal combustion engine.

7. The control device for a hybrid vehicle according to claim 1, wherein the controller is configured to set the first charge/discharge amount as the charge/discharge demand when the first charge/discharge amount is equal to or larger than the second charge/discharge amount.

8. A hybrid vehicle provided with the control device according to claim 1.

9. A control method for a hybrid vehicle, the hybrid vehicle including an internal combustion engine, a first rotating electric machine, a second rotating electric machine, a planetary gear, an electricity storage device, and a controller, the planetary gear being mechanically coupled to an output shaft of the internal combustion engine, to a rotating shaft of the first rotating electric machine, and to a drive shaft, the electricity storage device being configured to give/receive an electric power to/from the first and second rotating electric machines, the control method comprising:

setting, by the controller, a drive mode to a limp home mode in which the internal combustion engine and the first rotating electric machine are driven to drive the hybrid vehicle, when an abnormality in the second rotating electric machine is sensed;

setting, by the controller, the smaller one of a second charge/discharge amount and a third charge/discharge amount as a charge/discharge demand, in a case where a first charge/discharge amount is smaller than a second charge/discharge amount during the limp home mode, the first charge/discharge amount being a charge/discharge amount that is input/output to/from the electricity storage device when the internal combustion engine is operated so as to generate a driving force required for the hybrid vehicle, the second charge/discharge amount being based on a charged state of the electricity storage device, and the third charge/discharge amount being based on an upper-limit rotation speed of the internal combustion engine that is set in accordance with a torque transmitted by the drive shaft; and controlling, by the controller, the internal combustion engine and the first rotating electric machine such that the electricity storage device receives/outputs an electric power in accordance with the charge/discharge demand.

* * * * *